United States Patent
Jiang et al.

(10) Patent No.: US 11,113,547 B2
(45) Date of Patent: Sep. 7, 2021

(54) PLANNING CONTROL IN RESPONSE TO A DRIVING OBSTRUCTION DURING OPERATION OF AN AUTONOMOUS DRIVING VEHICLE (ADV)

(71) Applicant: Baidu USA LLC, Sunnyvale, CA (US)

(72) Inventors: Yifei Jiang, Sunnyvale, CA (US);
Jiaming Tao, Sunnyvale, CA (US);
Dong Li, Sunnyvale, CA (US);
Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 526 days.

(21) Appl. No.: 15/610,351

(22) Filed: May 31, 2017

(65) Prior Publication Data

US 2018/0349713 A1  Dec. 6, 2018

(51) Int. Cl.
*G05D 9/00* (2006.01)
*G06K 9/00* (2006.01)
*G05D 1/02* (2020.01)
*B60W 30/00* (2006.01)
(Continued)

(52) U.S. Cl.
CPC ......... *G06K 9/00805* (2013.01); *B60W 30/00* (2013.01); *B62D 15/025* (2013.01); *B62D 15/0265* (2013.01); *G05D 1/0223* (2013.01); *B60T 2210/32* (2013.01); *G05D 1/028* (2013.01); *G05D 1/0231* (2013.01); *G05D 1/0255* (2013.01); *G05D 1/0257* (2013.01);
(Continued)

(58) Field of Classification Search
CPC .......... G06K 9/00791; G06K 9/00798; G06K 9/00805; G06K 9/00825; G08G 1/00
See application file for complete search history.

(56) References Cited

U.S. PATENT DOCUMENTS

| | | | | |
|---|---|---|---|---|
| 6,026,347 A | * | 2/2000 | Schuster | B62D 1/28 180/167 |
| 2010/0292871 A1 | * | 11/2010 | Schultz | G08G 5/0086 701/3 |
| 2017/0101093 A1 | * | 4/2017 | Barfield, Jr. | B60W 50/14 |

(Continued)

FOREIGN PATENT DOCUMENTS

| CN | 101636304 A | 1/2010 |
|---|---|---|
| CN | 102227612 A | 10/2011 |

(Continued)

*Primary Examiner* — James M McPherson
(74) *Attorney, Agent, or Firm* — Womble Bond Dickinson (US) LLP

(57) ABSTRACT

Described is a system for providing an autonomous driving control mechanism in response to a driving obstruction. The system includes a framework for providing a decision process that may learn from surrounding vehicles and traffic flow to determine a suitable responsive action. The system may observe other vehicles and determine a trajectory for the vehicle to follow. The system may rely on a specialized blocking detection and decision components that may provide a set of instructions or rules in order to maneuver around the obstruction. In addition, the system may compare the maneuver with a detour and determine the most suitable route for the vehicle based on an analysis of several factors. Accordingly, the system may continue to provide safe and efficient autonomous control even when encountering a driving obstruction.

16 Claims, 7 Drawing Sheets

(51) Int. Cl.
*B62D 15/02* (2006.01)
*G08G 1/0968* (2006.01)

(52) U.S. Cl.
CPC ..... *G05D 1/0278* (2013.01); *G08G 1/096827* (2013.01)

(56) References Cited

U.S. PATENT DOCUMENTS

| | | | |
|---|---|---|---|
| 2017/0256147 A1* | 9/2017 | Shanahan | G08G 1/164 |
| 2018/0170374 A1* | 6/2018 | Otsuka | B60W 50/02 |
| 2018/0209795 A1* | 7/2018 | Okuyama | G01C 21/30 |
| 2018/0345963 A1* | 12/2018 | Maura | G06K 9/00798 |
| 2019/0043274 A1* | 2/2019 | Hayakawa | G08G 1/096775 |

FOREIGN PATENT DOCUMENTS

| | | | | |
|---|---|---|---|---|
| CN | 103842228 A | 6/2014 | | |
| CN | 105015545 A | 11/2015 | | |
| CN | 205292627 U | 6/2016 | | |
| WO | WO-2017110892 A1 * | 6/2017 | ........... | G05D 1/0088 |

\* cited by examiner

PLANNING CONTROL IN RESPONSE TO A DRIVING OBSTRUCTION DURING OPERATION OF AN AUTONOMOUS DRIVING VEHICLE (ADV)

TECHNICAL FIELD

Embodiments of the present disclosure relate generally to operating autonomous vehicles. More particularly, embodiments of the disclosure relate to providing alternative route planning in response to a driving obstruction.

BACKGROUND

Vehicles operating in an autonomous mode (e.g. driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Route planning and control are significant operations for an autonomous driving system and typically rely on a predictable set of observations perceived by the driving system. However, when the driving system encounters an unfamiliar situation such as a driving obstruction due to a traffic accident, construction, temporary road blocking, etc., the system is posed with a unique set of challenges. For example, the system may not be equipped to gather sufficient information with respect to the obstruction. In addition, it is often difficult for the system to deduce the cause of the obstruction. Moreover, other driver's responses may deviate from normal driving behavior, which in turns poses an additional set of challenges for the system. Finally, it is often difficult for the system to predict such obstructions. Accordingly, in most instances, the system may ultimately differ to a human driver for navigation. Thus, there is a need for autonomous driving systems to recognize obstructions and to continue to provide or facilitate autonomous control as a reactionary course of action.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

Described is a system (and method) for providing an autonomous driving control mechanism in response to recognizing a driving obstruction. The system includes a framework for providing a decision process that may learn from surrounding vehicles and traffic flow to determine a suitable responsive action. The system may observe other vehicles in response to the obstruction and determine a trajectory for the vehicle to follow as a reactionary maneuver. In order to respond to an obstruction, the system may rely on a specialized detection and decision components that may provide a set of instructions or rules in order to maneuver around the obstruction. In addition, the system may compare the maneuver with a detour and determine the most suitable route for the vehicle based on an analysis of several factors. Accordingly, the system may continue to provide safe and efficient autonomous control even when encountering a driving obstruction.

Figure 1:
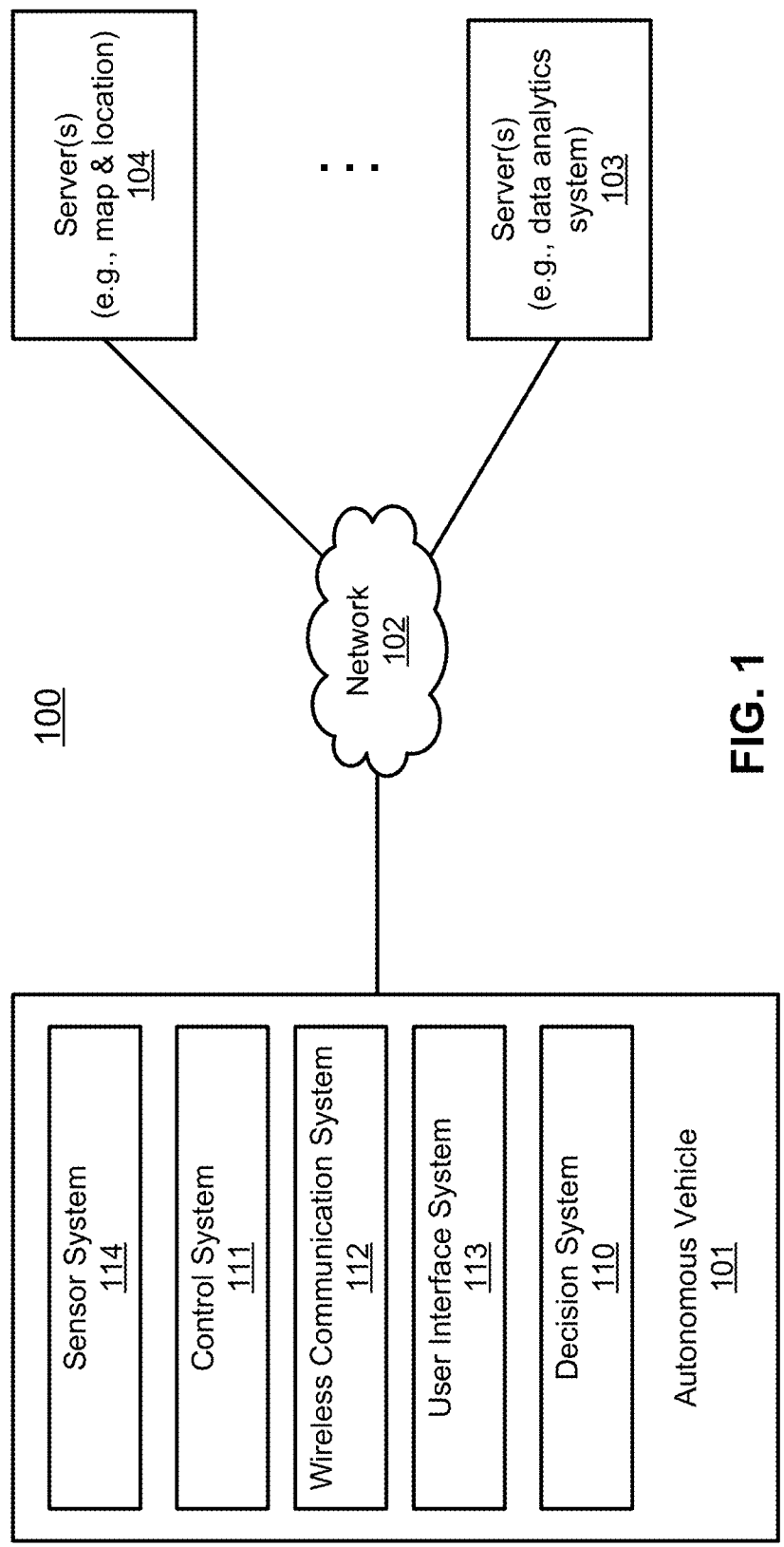
FIG. 1 is a block diagram illustrating an autonomous vehicle network configuration according to one embodiment of the disclosure

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle (or vehicle) refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 may include a decision system 110, vehicle control system 111, wireless communication system 112, user interface system 113, and sensor system 114. Autonomous vehicle 101 may further include certain common components included in ordinary vehicles, such as, an engine, wheels, steering wheel, transmission, etc., which may be controlled by vehicle control system 111 and/or decision system 110 using a variety of communication signals and/or commands, such as, for example, acceleration signals or commands, deceleration signals or commands, steering signals or commands, braking signals or commands, etc.

Components 110-114 may be communicatively coupled to each other via an interconnect, a bus, a network, or a combination thereof. For example, components 110-114 may be communicatively coupled to each other via a controller area network (CAN) bus. A CAN bus is a vehicle bus standard designed to allow microcontrollers and devices to communicate with each other in applications without a host computer. For example, it may include a message-based protocol, designed originally for multiplex electrical wiring within automobiles, but is also used in many other contexts.

Figure 2:
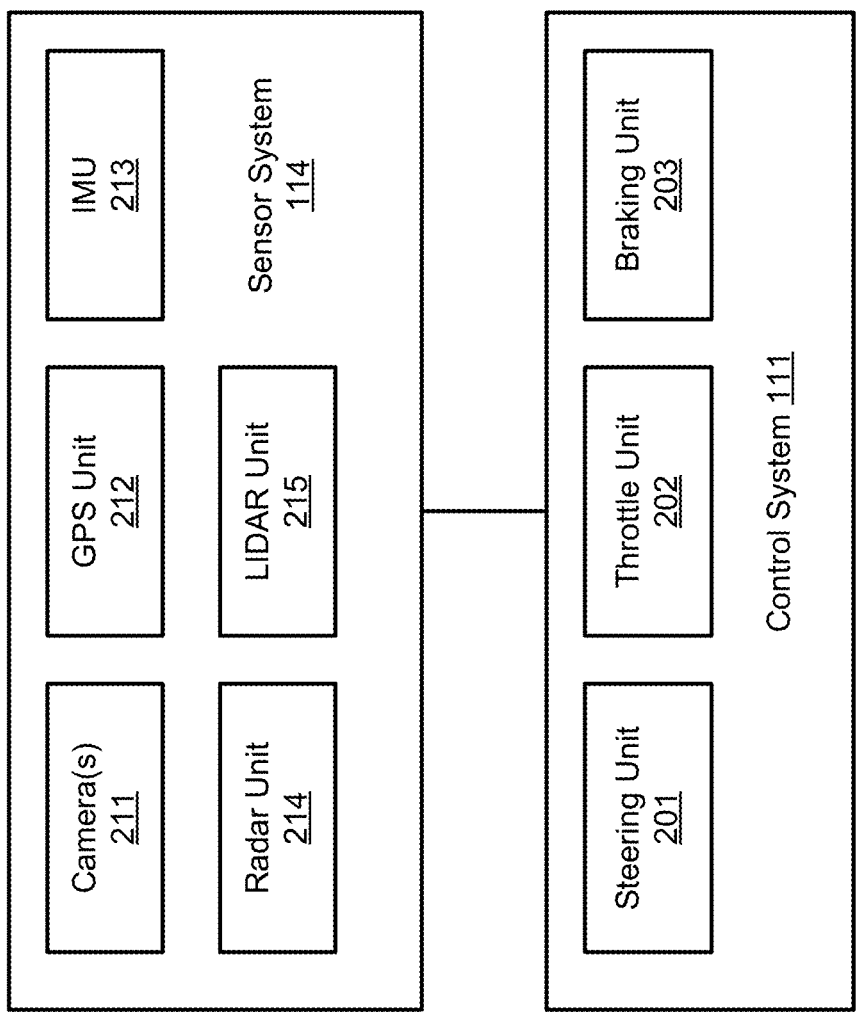
FIG. 2 is a block diagram illustrating a sensor and control system according to one embodiment of the disclosure.

Referring now to FIG. 2, in one embodiment, sensor system 114 may include one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 114 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 may include steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by decision system 110, especially when operating in an autonomous driving mode. Decision system 110 includes the necessary hardware (e.g., processor(s), memory, storage) and software (e.g., operating system, planning and routing programs) to receive information from sensor system 114, control system 111, wireless communication system 112, and/or user interface system 113, process the received information, plan a route or path from a starting point to a destination point, and then drive vehicle 101 based on the planning and control information. Alternatively, decision system 110 may be integrated with vehicle control system 111.

While autonomous vehicle 101 is moving along the route, decision system 110 may also obtain real-time traffic information from a traffic information system or server (TIS). Note that servers 103-104 may be operated by a third party entity. Alternatively, the functionalities of servers 103-104 may be integrated with decision system 110. Based on the real-time traffic information, MPOI information, and location information, as well as real-time local environment data detected or sensed by sensor system 114 (e.g., obstacles, objects, nearby vehicles), decision system 110 can plan an optimal route and drive vehicle 101, for example, via control system 111, according to the planned route to reach the specified destination safely and efficiently. As further described herein, the decision system 110 may update the planned route in response to recognizing a driving obstruction.

Figure 3:
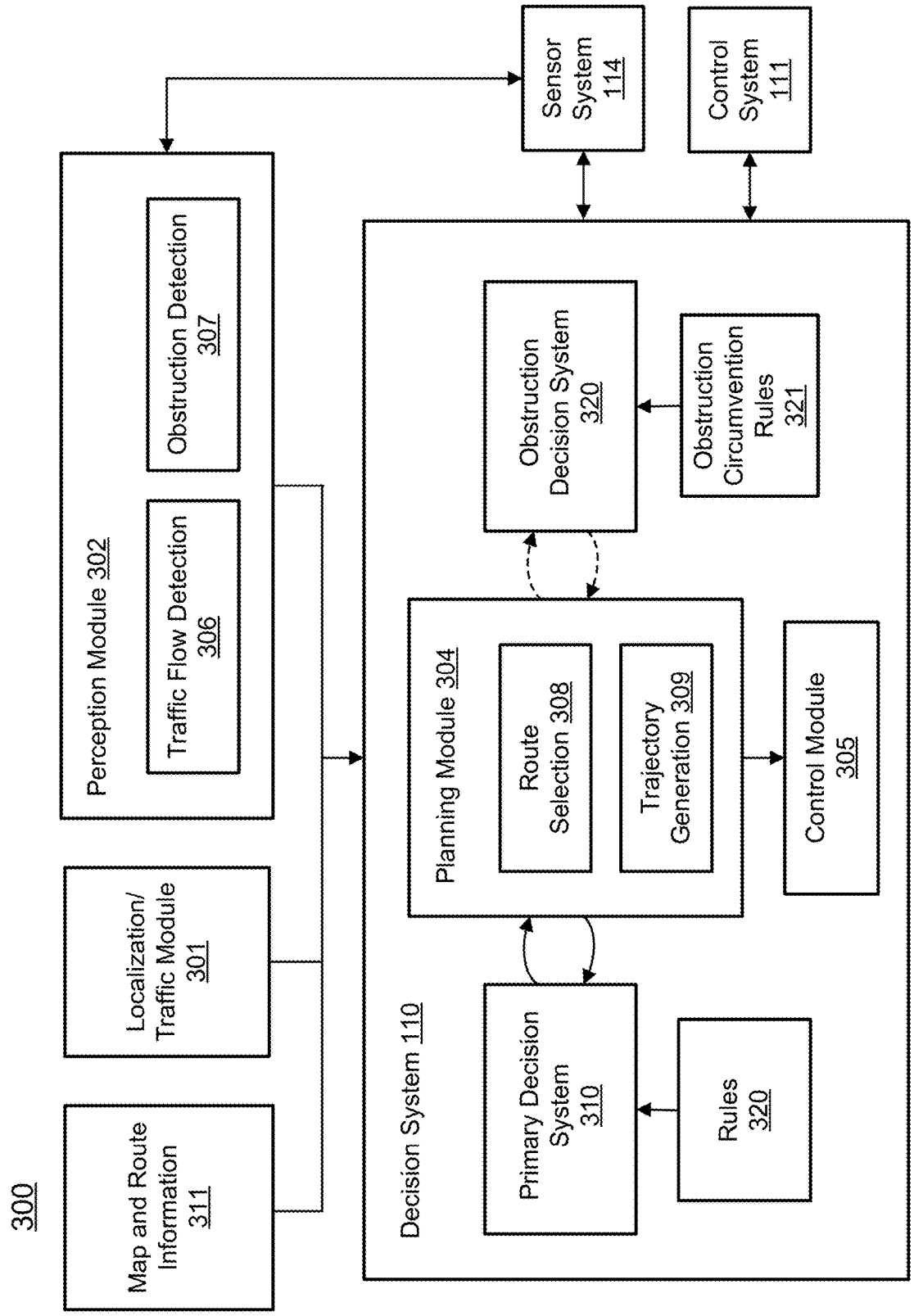
FIG. 3 is a block diagram illustrating an example system used for decision planning and control with an autonomous vehicle according to one embodiment of the disclosure.

FIG. 3 is a block diagram illustrating example system used with an autonomous vehicle according to one embodiment of the disclosure. System 300 may be implemented as a part of autonomous vehicle 101, or part of system 100, of FIG. 1. Referring to the embodiment of FIG. 3, system 300 includes, but is not limited to, localization/traffic module 301, map and route information 311, perception module 302, decision system 110, which may include a planning module 304, a primary decision system 310, and an obstruction decision system 320. As further described herein, the obstruction decision system 320 may be invoked when a driving obstruction is encountered. Accordingly, the primary decision system 310 may include its own rules 311, and the obstruction decision system 320 may include its own obstruction circumvention rules 321.

Localization/traffic module 301 may manage any data related to a trip or route of a user. A user may log in and specify a starting location and a destination of a trip, for example, via a user interface. Localization/traffic module 301 may communicate with other components of autonomous vehicle 101, such as map and route information 311, to obtain the trip related data. For example, localization/traffic module 301 may obtain location and route information from a location server and a map and POI (MPOI) server. A location server provides location services and an MPOI server provides map services and the POIs of certain locations, which may be cached as part of map and route information 311. While autonomous vehicle 101 is moving along the route, localization/traffic module 301 may also obtain real-time traffic information from a traffic information system or server. As further described, this real-time traffic information may be used when determining a course of action (e.g. detour) to undertake in response to a driving obstruction.

Based on the sensor data provided by sensor system 114 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

The perception module 302 may perform traffic flow detection 306 and obstruction detection 307. Traffic flow detection 306 may include observing various objects to determine various traffic flows. As described above, the perception module 302 may analyze one or more vehicles and determine various characteristics such as speed and direction. Based on this analysis, which may be used in conjunction with other data (e.g. traffic signals, real-time traffic data, etc.), the perception module 302 may perform obstruction detection 307.

Obstruction detection 307 may include determining whether there is a driving obstruction of any type. For example, a driving obstruction may include a traffic accident, construction, traffic barriers, a stalled vehicle, or any other event that causes normal traffic flow to be obstructed or hindered. Obstruction detection 307 may include an analysis of the speed and direction of one or more vehicles to determine the existence of a driving obstruction. For example, the system may determine whether one or more vehicles are at a standstill, or whether other vehicles are performing atypical driving maneuvers such as crossing over a median line. In addition, the obstruction detection 307 may also rely on other observations in conjunction with the traffic flow detection 306. For example, the system may perceive various objects that provide an indication of a potential obstruction such as barriers (e.g. pylons), signs, flashing lights (e.g. from first responders), etc. that may be used as part of the obstruction detection analysis. Accordingly, based on the above analysis, the system may deduce whether there is an obstruction on the roadway.

The map and route information 311, the localization/traffic module 301, and perception module 302, may provide data utilized by the decision system 110. In one embodiment, the decision system 110 may include a primary decision system 310 and an obstruction decision system 320. As further described herein, the obstruction decision system 320 may be initiated in response to detecting a driving obstruction. In general, however, decision systems 310/320 make a decision regarding how to handle the object identified by the perception module. For example, for a particular object (e.g., another vehicle in a crossing route) as well as its metadata describing the object (e.g., a speed, direction, turning angle), decision systems 310/320 decide how to encounter the object (e.g., overtake, yield, stop, pass). Decision systems 310/320 may make such decisions according to a set of rules such as traffic rules, which may be stored in persistent storage device.

Based on a decision for each of the objects perceived, planning module 304 plans a path or route for the autonomous vehicle, as well as driving parameters (e.g., distance, speed, and/or turning angle). For example, when the primary decision system 310 is in operation (e.g. normal or default operating mode), decision system 310 decides what to do with the object, while planning module 304 determines how to do it. For example, for a given object, decision system 320 may decide to pass the object, while planning module 304 may determine whether to pass on the left side or right side of the object. Planning and control data may be generated by planning module 304 including information describing how vehicle 101 would move in a next moving cycle (e.g., next route/path segment). For example, the planning and control data may instruct vehicle 101 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In some embodiments, the primary decision system 310 may operate under normal operating conditions and may utilize particular rules 320. These rules may provide a framework within which the primary decision system 310 operates. For example, these rules 320 may include traffic rules, route rules, ride comfort rules, etc. For instance, traffic rules may provide the primary decision system 310 with guidance on particular traffic rules in particular jurisdictions (e.g. right on red), or particular rules with respect to pedestrians or cyclists. Route rules may relate to providing guidance on particular preferences for routes (e.g. avoid tolls, etc.) and other rules related to navigation. Ride comfort rules, for example, maybe user specified. For example, ride comfort rules may include preferences for speed, gas mileage, terrain, etc.

As described, the primary decision system 310 may operate under normal driving conditions. In some circumstances, however, an obstruction decision system 320 may be initiated. For example, in some embodiments, driving control of the vehicle 101 may switch from the primary decision system 310 to the obstruction decision system 320 in response to detecting a driving obstruction. Accordingly, in one embodiment, the vehicle 101 may be controlled using a set of obstruction circumvention rules 321. The obstruction circumvention rules 321 may provide guidance with which the obstruction decision system 320 operates. The obstruction circumvention rules 321 may include specialized rules for maneuvering in response to an obstruction. In one embodiment, the obstruction circumvention rules 321 may include certain rules that may override rules 320. For example, rules 320 may ensure the vehicle stays within appropriate driving lanes or on the correct side of a median or dividing line separating two-way traffic (e.g. double yellow lines), and the obstruction rules 320 may allow the planning module 304 under certain conditions cross a dividing line as part of a maneuver to navigate an obstruction. Accordingly, the ability to override certain rules may allow the vehicle to perform maneuvers that would typically not be allowed under normal circumstances, but are deemed safe (e.g. based on following a flow of traffic).

The planning module 304 may receive information from the primary decision system 310 and/or the obstruction decision system 320. The planning module 304 may include route selection 308 and trajectory generation 309. As described, route selection 308 may include driving the vehicle from a first point to a second point of a route or path. This route or path, however, may be updated to maneuver around an obstruction. Route selection 308 may also include a determination between maneuvering around the obstruction or following a detour (e.g. alternate roads, etc.). Thus, in one embodiment, the route selection 308 may include performing a comparison between the maneuver and the detour and selecting the most efficient course of action.

In order to navigate around an obstruction, the system may determine a traffic flow pattern of one or more other vehicles. The traffic flow pattern of one or more other vehicles may be based on analyzing the speed and direction of the other vehicles as further described herein. Based on the determined traffic pattern, the planning module 304 may perform trajectory generation 309. The trajectory generation 309 may provide a route for the vehicle to follow for circumventing the driving obstruction as further described herein.

It should be noted with respect to FIG. 3, that decision systems 310/320 and planning module 304 may be integrated as an integrated module. For example, primary decision system 310 and planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In addition, some or all of modules (or systems) shown in FIG. 3 may be implemented in software, hardware, or a combination thereof. For example, these modules may be installed in persistent storage device, loaded into memory, and executed by one or more processors. Note that some or all of these modules may be communicatively coupled to or integrated with some or all modules of vehicle control system 111 of FIG. 2. Some of modules may be integrated together as an integrated module. In addition, such components (e.g. modules and systems) can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
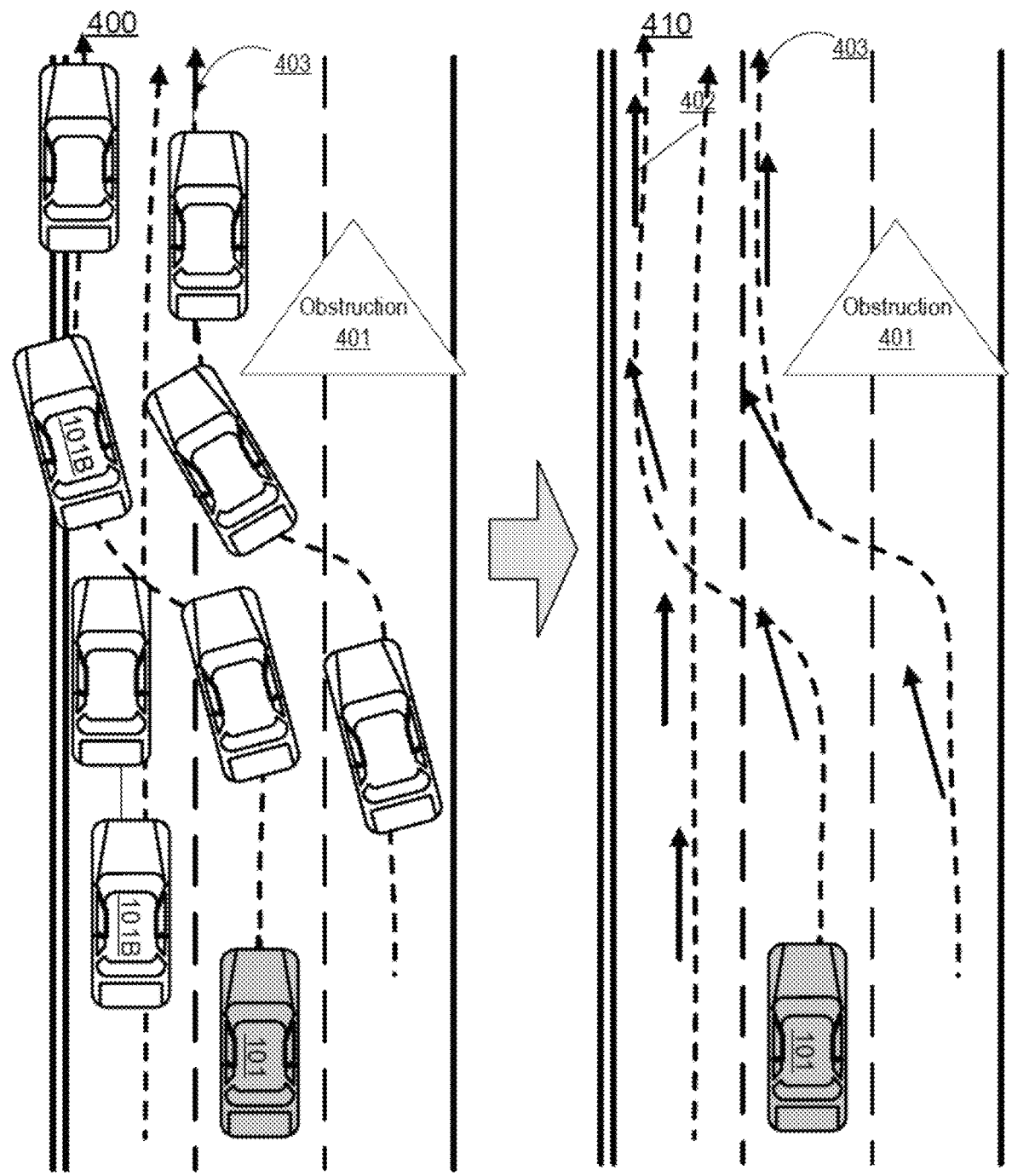
FIG. 4 is a diagram illustrating an example of analyzing a traffic flow pattern according to one embodiment of the disclosure.

FIG. 4 is a diagram illustrating an example of analyzing a traffic flow pattern according to one embodiment of the disclosure. As shown in diagram 400, in response to a driving obstruction 401, one or more other vehicles 101B may create a traffic flow pattern 403 to circumvent the obstruction. As described above, the vehicle 101 may detect the obstruction 401 itself and/or may determine the presence of the obstruction 401 based on the detected traffic pattern 403. As shown in diagram 410, the traffic flow pattern 403 may be analyzed by determining information of the other vehicles 101B. For example, a speed and direction of the other vehicles 101B may be determined. Accordingly, this information may be represented in a format suitable for analysis. For example as shown, this information may be converted into vectors 402, or any other suitable representation. Accordingly, the system may perform various mathematical calculations and analysis with the traffic pattern data.

When analyzing a traffic flow pattern, the system may invoke various safety protocols. One such protocol may include utilizing a threshold for the number of vehicles performing a maneuver. For example, if only a single (or few) vehicles perform a particular maneuver, it may not necessarily be a safe maneuver and may occur based on a particular driver's unsafe decision or violation. Moreover, the system may also rely on additional observations such as a traffic officer directing traffic, or specialized barriers that may have been erected in response to the obstruction.

Figure 5:
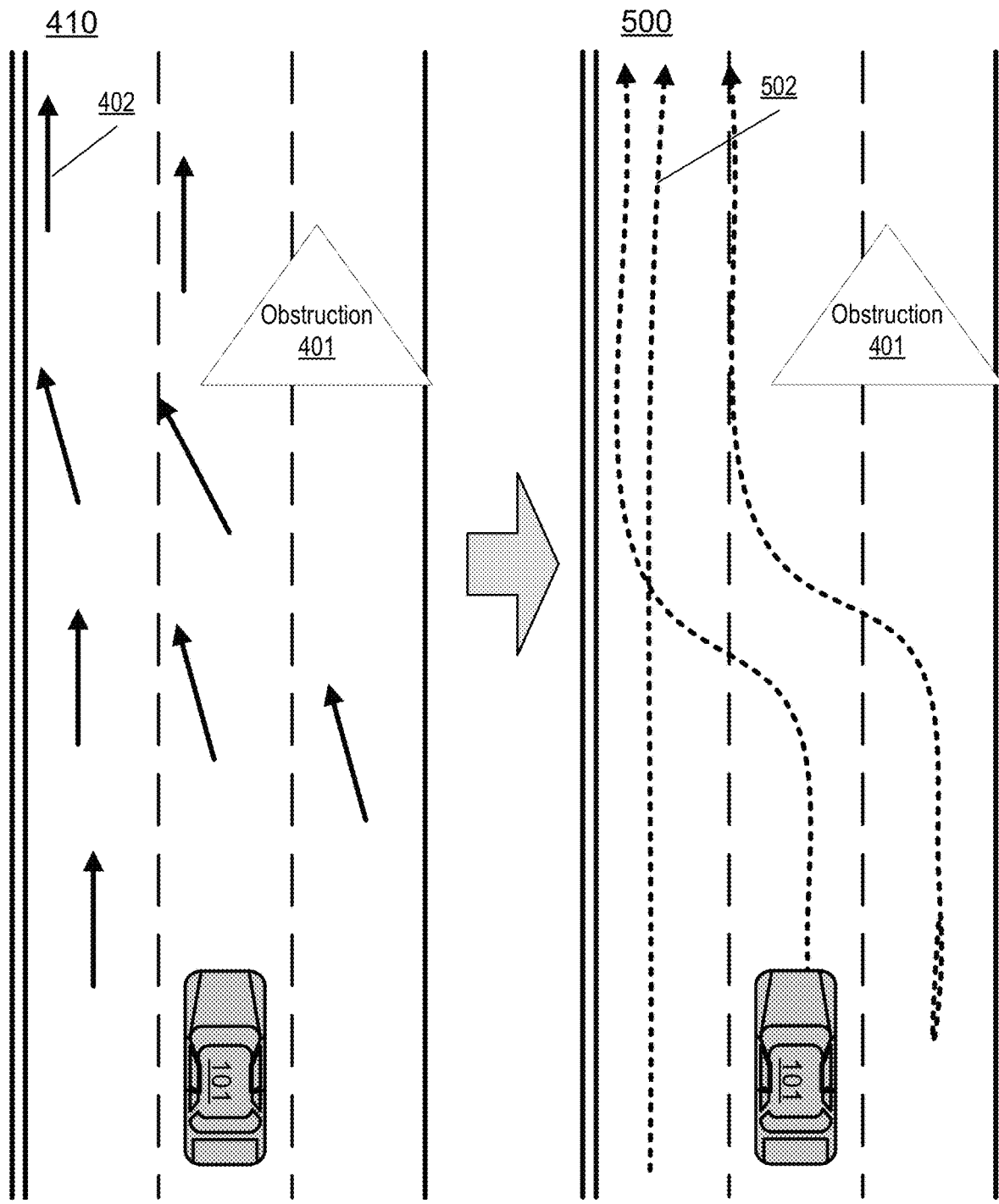
FIG. 5 is a diagram illustrating an example of generating a trajectory based on a traffic flow pattern according to one embodiment of the disclosure.

FIG. 5 is a diagram illustrating an example of generating a trajectory based on a traffic flow pattern of FIG. 4. As shown in diagram 500, the system may determine a driving maneuver (or driving route) based on the analyzed traffic flow pattern 403 as shown in diagram 410. Accordingly, the vehicle 101 may follow the determined driving maneuver to circumvent the obstruction 401. In one embodiment, the driving maneuver may include generating a trajectory 502. The trajectory 502 may include various calculations to enable the driving maneuver such as a smoothing mechanism. As another example, the trajectory 502 may adapt the driving maneuver for a particular driving lane of the vehicle 101. In one embodiment, the trajectory 502 may update a driving route that is undertaken by the vehicle 101. For example, under normal conditions (e.g. no obstruction), the driving route in this example may include remaining in a particular lane. As shown, however, the driving route may be updated based on the trajectory 502 to maneuver around the obstruction. In addition, the updated route may include utilizing additional rules (e.g. obstruction circumvention rules 321) in order to allow the vehicle 101 to partially cross the two-way traffic dividing line as part of the maneuver, which may not otherwise be allowed (at least in autonomous mode) using the typical or convention rules 320. Thus, in some embodiments, the system may override particular rules in order to circumvent the driving obstruction 401.

In addition, when encountering a driving obstruction, the system may determine whether to navigate around the obstruction, or to proceed to take a detour (e.g. alternative route). When making such a determination, the system may weigh several factors. These factors may be analyzed and a cost for each factor may be considered. One factor may include the current traffic flow speed. For example, an observed slower or standstill traffic pattern may incur a higher cost. Another factor may include an estimated time to maneuver around the obstruction. Similarly, the system may factor the estimated time required to proceed using a detour. Other factors may also include variables related to perform switching from the current route plan to another route plan. For example, a risk factor may be determined for performing the maneuver to avoid the obstruction and/or a risk factor for following the detour. For example, a maneuver that requires crossing over into potential oncoming traffic may incur a higher cost. As another example, a detour that requires driving through a flooded road may incur a higher cost. Accordingly, the system may determine the appropriate course of action (e.g. route selection) based on analyzing various factors. In addition, the factors may be weighted and these weights may be dynamically updated based on the current driving conditions.

Figure 6:
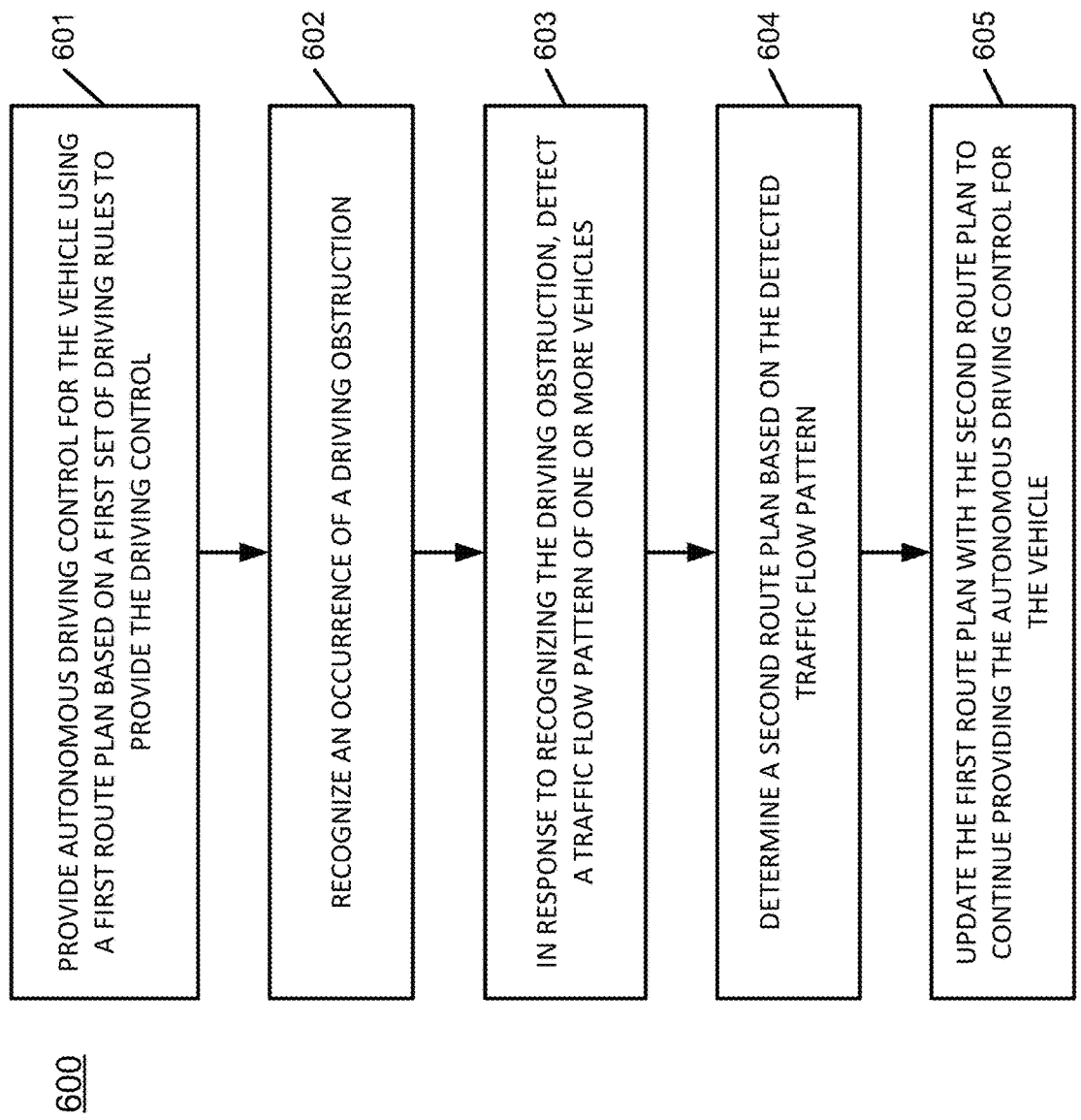
FIG. 6 is an example flow diagram illustrating a method of controlling an autonomous vehicle in response to detecting a driving obstruction according to an embodiment of the disclosure.

FIG. 6 is an example flow diagram illustrating a method of control of an autonomous vehicle in response to detecting a driving obstruction according to an embodiment of the disclosure. Process 600 may use processing logic which may include software, hardware, or a combination thereof. For example, process 600 may be performed by a system (e.g. systems 100 or 300), or a computing device or device.

In 601, the system may provide autonomous driving control for the vehicle using a first route plan based on a first set of driving rules (e.g. rules 32). In one embodiment, the driving control may be provided by a decision system.

In 602, the system may recognize, using one or more sensors of the vehicle (e.g. sensor system 114), an occurrence of a driving obstruction (e.g. driving obstruction 401). Recognizing an occurrence of a driving obstruction may include analyzing a speed and direction of one or more other vehicles (e.g. 101B).

In 603, in response to recognizing the driving obstruction, the system may detect a traffic flow pattern of one or more vehicles. In one embodiment, detecting the traffic flow pattern may include detecting one or more vehicles maneuvering in response to the driving obstruction, and determining a speed and direction of the one or more vehicles.

In 604, the system may determine a second route plan based on the detected traffic flow pattern (e.g. traffic flow pattern 403). Determining the second route plan may include determining a trajectory (e.g. trajectory 502) for the vehicle to follow as a maneuver in response to the driving obstruction. For example, the determined trajectory may be based on the speed and direction of the other vehicles.

In 605, the system may update the first route plan with the second route plan to continue providing the autonomous driving control for the vehicle. Updating the first route plan with the second route plan may include overriding the first set of driving rules with a second set of driving rules (e.g. obstruction circumvention rules 321). For example, the first set of driving rules may include one or more driving lane rules and the second set of rules may override the one or more driving lane rules.

Figure 7:
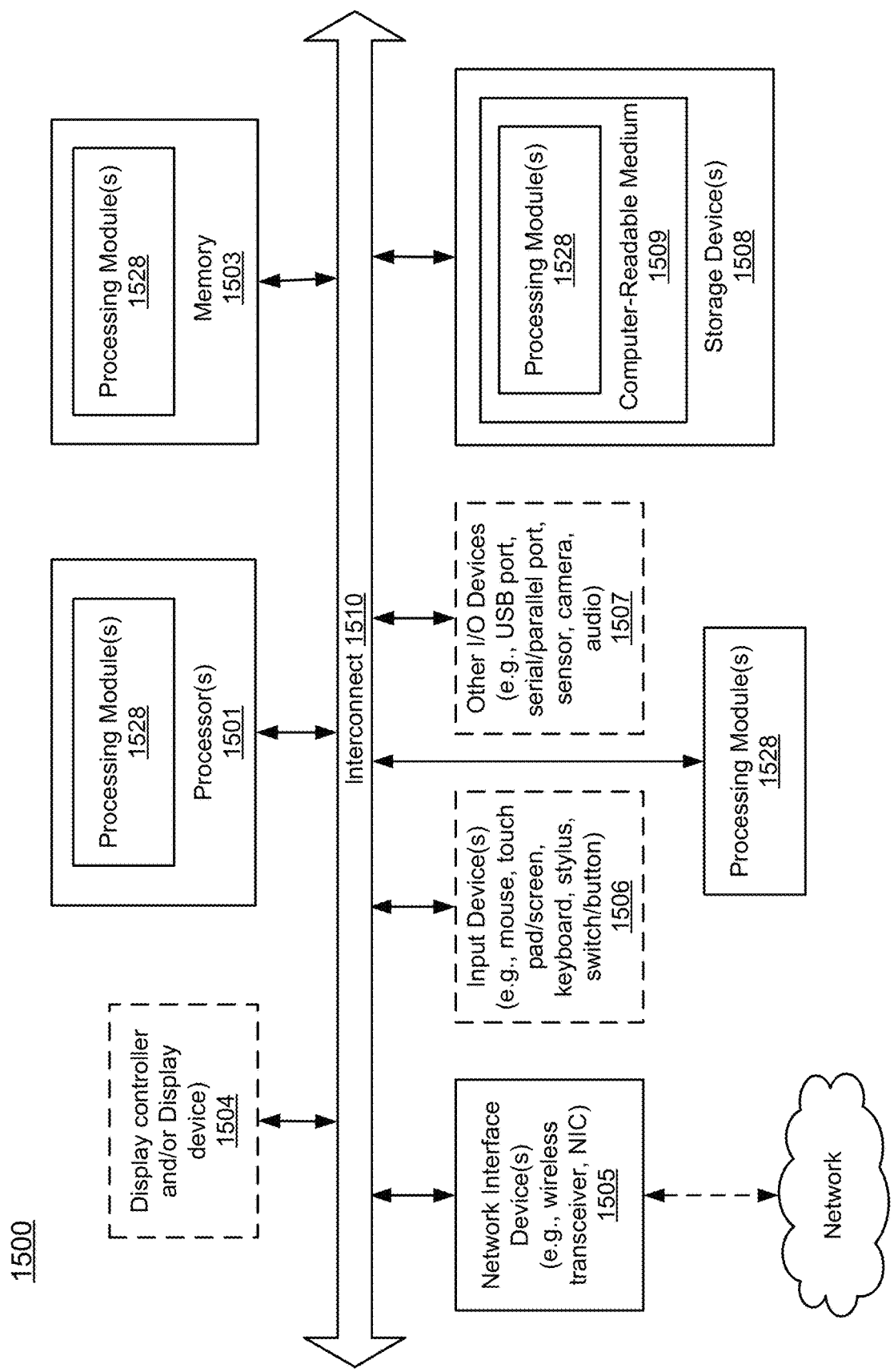
FIG. 7 is a block diagram illustrating an example computing system used in conjunction with one or more embodiments of the disclosure.

FIG. 7 is a block diagram illustrating an example computing system used in conjunction with one or more embodiments of the disclosure.

For example, system 1500 may represent any of data processing systems described above performing any of the processes or methods described above, such as, for example, one or more components 110-114 of the autonomous vehicle 101, or servers 103-104 described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501 may be configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). For example, vehicle 101 may include an internal electronic display. In this regard, internal electronic display may be located within a cabin of vehicle. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-accessible storage medium 1509 (also known as a machine-readable storage medium or a computer-readable medium) on which is stored one or more sets of instructions or software (e.g., component, module, unit, and/or logic 1528) embodying any one or more of the methodologies or functions described herein.

Component/module/unit/logic (e.g. processing modules) 1528 may represent any of the components described above, such as, for example, decision system 110, sensor system 114, and control system 111 (and related modules and sub-modules). Component/module/unit/logic 1528 may also reside, completely or at least partially, within memory 1503 and/or within processor 1501 during execution thereof by data processing system 1500, memory 1503 and processor 1501 also constituting machine-accessible storage media. In addition, component/module/unit/logic 1528 can be implemented as firmware or functional circuitry within hardware devices. Further, component/module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; and phase-change memory).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for providing autonomous driving control for a vehicle, comprising:
   providing autonomous driving control for the vehicle using a first route plan based on a first set of driving rules, wherein the first set of driving rules include traffic rules providing guidance on traffic rules in jurisdictions, route rules providing guidance on preferences for routes, and ride comfort rules having preferences for speed or terrain;
   recognizing, using one or more sensors of the vehicle, an occurrence of a driving obstruction, wherein recognizing the occurrence of a driving obstruction includes perceiving objects indicative of a potential obstruction and determining whether one or more other vehicles are at standstill or crossing over a median line;
   in response to recognizing the driving obstruction, detecting a traffic flow pattern of the one or more other vehicles, including analyzing traffic flow pattern data by determining whether a number of vehicles within the one or more vehicles performing a maneuver exceeds a predetermined threshold related to the maneuver and converting a speed and direction of the one or more other vehicles within the detected traffic flow pattern into vectors;
   determining a second route plan based on the detected traffic flow pattern, including
      determining a trajectory for the vehicle to follow as the maneuver in response to the driving obstruction, wherein the determined trajectory is based on the speed and direction of the other vehicles, determining a detour for the vehicle to follow in response to the driving obstruction, comparing the detour to the maneuver based on one or more factors, and determining to perform the maneuver over the detour based on the comparison of factors, wherein comparing the detour to the maneuver includes determining a traffic flow speed factor of the other vehicles maneuvering in response to the driving obstruction, wherein the traffic flow speed factor is used to determine an estimated time for the vehicle to maneuver around the driving obstruction, and determining an estimated time factor for the vehicle to complete the detour based on real-time traffic information; and updating the first route plan with the second route plan utilizing the first set of driving rules to continue providing the autonomous driving control for the vehicle.

2. The method of claim 1, wherein detecting the traffic flow pattern includes detecting the one or more other vehicles maneuvering in response to the driving obstruction, and determining the speed and direction of the other vehicles within the detected traffic flow pattern.

3. The method of claim 1, wherein comparing the detour to the maneuver further includes determining a risk factor for performing at least one of the maneuver or the detour.

4. The method of claim 1, wherein recognizing the occurrence of a driving obstruction includes analyzing a speed and direction of one or more other vehicles, and determining the speed and direction of the other vehicles indicates a presence of a driving obstruction.

5. The method of claim 1, wherein updating the first route plan with the second route plan includes overriding the first set of driving rules with a second set of driving rules.

6. The method of claim 5, wherein the first set of driving rules includes one or more driving lane rules and the second set of driving rules overrides the one or more driving lane rules.

7. A non-transitory machine-readable medium having instructions stored therein, which when executed by a processor, cause the processor to perform operations, the operations comprising:

providing autonomous driving control for a vehicle using a first route plan based on a first set of driving rules, wherein the first set of driving rules include traffic rules providing guidance on traffic rules in jurisdictions, route rules providing guidance on preferences for routes, and ride comfort rules having preferences for speed or terrain;

recognizing, using one or more sensors of the vehicle, an occurrence of a driving obstruction, wherein recognizing the occurrence of a driving obstruction includes perceiving objects indicative of a potential obstruction and determining whether one or more other vehicles are at standstill or crossing over a median line;

in response to recognizing the driving obstruction, detecting a traffic flow pattern of the one or more other vehicles, including analyzing traffic flow pattern data by determining whether a number of vehicles within the one or more vehicles performing a maneuver exceeds a predetermined threshold related to the maneuver and converting a speed and direction of the one or more other vehicles within the detected traffic flow pattern into vectors;

determining a second route plan based on the detected traffic flow pattern, wherein determining the second route plan includes determining a trajectory for the vehicle to follow as a maneuver in response to the driving obstruction, wherein the determined trajectory is based on the speed and direction of the other vehicles, including determining a trajectory for the vehicle to follow as the maneuver in response to the driving obstruction, wherein the determined trajectory is based on the speed and direction of the other vehicles, determining a detour for the vehicle to follow in response to the driving obstruction, comparing the detour to the maneuver based on one or more factors, and determining to perform the maneuver over the detour based on the comparison of factors, wherein comparing the detour to the maneuver includes determining a traffic flow speed factor of the other vehicles maneuvering in response to the driving obstruction, wherein the traffic flow speed factor is used to determine an estimated time for the vehicle to maneuver around the driving obstruction, and determining an estimated time factor for the vehicle to complete the detour based on real-time traffic information; and updating the first route plan with the second route plan utilizing the first set of rules to continue providing the autonomous driving control for the vehicle.

8. The medium of claim 7, wherein detecting the traffic flow pattern includes detecting the one or more other vehicles maneuvering in response to the driving obstruction, and determining the speed and direction of the other vehicles within the detected traffic flow pattern.

9. The medium of claim 7, wherein comparing the detour to the maneuver further includes determining a risk factor for performing at least one of the maneuver or the detour.

10. The medium of claim 7, wherein recognizing the occurrence of a driving obstruction includes analyzing a speed and direction of one or more other vehicles, and determining the speed and direction of the other vehicles indicates a presence of a driving obstruction.

11. The medium of claim 7, wherein updating the first route plan with the second route plan includes overriding the first set of driving rules with a second set of driving rules, wherein the first set of driving rules includes one or more driving lane rules and the second set of rules overrides the one or more driving lane rules.

12. A data processing system for providing autonomous driving control for a vehicle, comprising:

a processor; and a memory coupled to the processor to store instructions, which when executed by the processor, cause the processor to perform operations, the operations including providing autonomous driving control for the vehicle using a first route plan based on a first set of driving rules wherein the first set of driving rules include traffic rules providing guidance on traffic rules in jurisdictions, route rules providing guidance on preferences for routes, and ride comfort rules having preferences for speed or terrain;

recognizing, using one or more sensors of the vehicle, an occurrence of a driving obstruction, wherein recognizing the occurrence of a driving obstruction includes perceiving objects indicative of a potential obstruction and determining whether one or more other vehicles are at standstill or crossing over a median line;

in response to recognizing the driving obstruction, detecting a traffic flow pattern of the one or more other vehicles, including analyzing traffic flow pattern data by determining whether a number of vehicles within the one or more vehicles performing a maneuver exceeds a predetermined threshold related to the maneuver and converting a speed and direction of the one or more other vehicles within the detected traffic flow pattern into vectors;

determining a second route plan based on the detected traffic flow pattern, wherein determining the second route plan includes determining a trajectory for the vehicle to follow as a maneuver in response to the driving obstruction, wherein the determined trajectory is based on the speed and direction of the other vehicles, including determining a trajectory for the vehicle to follow as the maneuver in response to the driving obstruction, wherein the determined trajectory is based on the speed and direction of the other vehicles, determining a detour for the vehicle to follow in response to the driving obstruction, comparing the detour to the maneuver based on one or more factors, and determining to perform the maneuver over the detour based on the comparison of factors, wherein comparing the detour to the maneuver includes determining a traffic flow speed factor of the other vehicles maneuvering in response to the driving obstruction, wherein the traffic flow speed factor is used to determine an estimated time for the vehicle to maneuver around the driving obstruction, and determining an estimated time factor for the vehicle to complete the detour based on real-time traffic information; and updating the first route plan with the second route plan utilizing the first set of rules to continue providing the autonomous driving control for the vehicle.

13. The system of claim 12, wherein recognizing the occurrence of a driving obstruction includes analyzing a speed and direction of one or more other vehicles, and determining the speed and direction of the other vehicles indicates a presence of a driving obstruction.

14. The system of claim 12, wherein updating the first route plan with the second route plan includes overriding the first set of driving rules with a second set of driving rules, wherein the first set of driving rules includes one or more driving lane rules and the second set of rules overrides the one or more driving lane rules.

15. The system of claim 12, wherein detecting the traffic flow pattern includes detecting the one or more other vehicles maneuvering in response to the driving obstruction, and determining the speed and direction of the other vehicles within the detected traffic flow pattern.

16. The system of claim 12, wherein comparing the detour to the maneuver further includes determining a risk factor for performing at least one of the maneuver or the detour.

* * * * *